US007238380B2

(12) United States Patent
Stillman

(10) Patent No.: US 7,238,380 B2
(45) Date of Patent: *Jul. 3, 2007

(54) WATER CONTAINING SOLUBLE FIBER

(76) Inventor: Suzanne Jaffe Stillman, 1712 Barrington Ave. #4, Los Angeles, CA (US) 90025

( * ) Notice: Subject to any disclaimer, the term of this patent is extended or adjusted under 35 U.S.C. 154(b) by 0 days.

This patent is subject to a terminal disclaimer.

(21) Appl. No.: 10/204,572

(22) PCT Filed: Feb. 22, 2001

(86) PCT No.: PCT/US01/05630

§ 371 (c)(1),
(2), (4) Date: Apr. 2, 2003

(87) PCT Pub. No.: WO01/62108

PCT Pub. Date: Aug. 30, 2001

(65) Prior Publication Data

US 2003/0211201 A1    Nov. 13, 2003

Related U.S. Application Data

(63) Continuation-in-part of application No. 09/510,400, filed on Feb. 22, 2000, now Pat. No. 6,248,390.

(51) Int. Cl.
A23L 1/304 (2006.01)
(52) U.S. Cl. .................. 426/590; 426/2; 426/74; 426/599; 426/648; 514/40
(58) Field of Classification Search ........... 426/590, 426/599, 74, 648, 2; 514/40
See application file for complete search history.

(56) References Cited

U.S. PATENT DOCUMENTS

| 4,283,432 A | 8/1981 | Mitchell et al. |
| 4,444,761 A | 4/1984 | Spiller |
| 4,447,532 A | 5/1984 | Coker et al. |
| 4,834,990 A | 5/1989 | Amer |
| 4,849,222 A | 7/1989 | Broaddus |
| 4,911,889 A | 3/1990 | Leland et al. |
| 4,988,530 A | 1/1991 | Hoersten et al. |
| 4,996,063 A | 2/1991 | Inglett |
| 5,032,411 A | 7/1991 | Stray-Gundersen |
| 5,082,673 A | 1/1992 | Inglett |
| 5,108,774 A | 4/1992 | Mills et al. |
| 5,126,332 A | 6/1992 | Ohta et al. |
| 5,149,541 A | 9/1992 | Leis, Jr. et al. |
| 5,162,128 A | 11/1992 | Mills et al. |
| 5,219,570 A | 6/1993 | Barbera |
| 5,225,219 A | 7/1993 | Inglett |
| 5,229,117 A | 7/1993 | Leland et al. |
| 5,229,172 A | 7/1993 | Cahalan et al. |
| 5,344,824 A | 9/1994 | Ohkuma et al. |
| 5,358,729 A | 10/1994 | Ohkuma et al. |
| 5,364,652 A | 11/1994 | Ohkuma et al. |
| 5,374,444 A * | 12/1994 | Langner ............... 426/590 |
| 5,380,717 A | 1/1995 | Ohkuma et al. |
| 5,430,141 A | 7/1995 | Ohkuma et al. |
| 5,447,730 A | 9/1995 | Greenleaf |
| 5,458,893 A | 10/1995 | Smith |
| 5,472,732 A | 12/1995 | Ohkuma et al. |
| 5,505,981 A | 4/1996 | Wakabayashi et al. |
| 5,516,535 A * | 5/1996 | Heckert et al. ............ 426/2 |
| 5,519,011 A | 5/1996 | Wakabayashi et al. |
| 5,567,424 A * | 10/1996 | Hastings ............ 424/195.17 |
| 5,587,197 A | 12/1996 | Meada et al. |
| 5,620,873 A | 4/1997 | Ohkuma et al. |
| 5,755,688 A | 5/1998 | Piontek et al. |
| 5,824,353 A * | 10/1998 | Tsunoda et al. ........... 426/66 |
| 5,851,578 A | 12/1998 | Gandhi |
| 5,958,497 A | 9/1999 | Grimm et al. |
| 5,968,365 A | 10/1999 | Laurenzo et al. |
| 5,976,603 A | 11/1999 | Kota et al. |
| 5,997,917 A | 12/1999 | Uchida et al. |
| 6,004,610 A * | 12/1999 | Wang et al. ............ 426/599 |

(Continued)

OTHER PUBLICATIONS

ProductScan Online, Worldwide beverage Industry in which products are marketed as containing Fiber or as being a good source of Fiber, 137 Full Reports, Mar. 1, 2003.

(Continued)

Primary Examiner—Helen Pratt
(74) Attorney, Agent, or Firm—Trojan Law Offices

(57) ABSTRACT

A water-like fluid containing safe water and a significant quantity of soluble dietary fiber. The resulting solution is generally optically clear and has physical properties similar to potable water. The fluid is intended as a replacement for bottled, or other water, as a means to ensure proper hydration. Depending on the soluble fiber used the fluid is either non-caloric or extremely low in calories. The amount of soluble fiber is adjusted to a specific amount of water so that consumption of an adequate amount of fluid ensures hydration (e.g., eight 8 oz. glasses per day) will also providing an optimal amount of dietary fiber. This is particularly valuable in stressed situations where the diet may not provide adequate fiber without supplementation. The constant metered supply of fiber provided throughout the day is preferable to, and more convenient than, "bolus" administration of fiber through laxatives, etc. Additionally, the constant presence of soluble fiber in the digestive tract provides the known beneficial effects of moderating the postprandial increase in blood glucose, modulating serum lipid levels, and suppressing appetite.

13 Claims, No Drawings

U.S. PATENT DOCUMENTS

| | | | | |
|---|---|---|---|---|
| 6,017,550 | A | * | 1/2000 | Berk et al. .................. 424/401 |
| 6,020,016 | A | | 2/2000 | Castleberry |
| 6,033,713 | A | * | 3/2000 | Sheldon ...................... 426/590 |
| 6,042,854 | A | * | 3/2000 | Morris et al. ................. 426/72 |
| 6,248,390 | B1 | * | 6/2001 | Stillman ..................... 426/590 |
| 6,383,534 | B1 | * | 5/2002 | Dyrr et al. .................... 426/74 |
| 6,413,558 | B1 | * | 7/2002 | Weber et al. .................. 426/2 |

OTHER PUBLICATIONS

ProductScan Online, Asian Beverage Industry in which products are marketed as fruit and Fruit flavored drinks, 154 Full Reports, Dec. 30, 2002.

ProductScan Online, German Beverage Industry in which products are marketed as fruit and Fruit flavored drinks, 127 Full Reports, May 13, 2002.

A.J. Vince, et al., The effect of lactulose, pectin, arabinogalactan and cellulose . . . , British Journal of Nutrition, 1990, vol. 63, pp. 17-26, London.

R. Robinson, et al., Effects of Dietary Arabinogalactan on Gastrointestinal and Blood . . . , Journal of the American College of Nutrition, 2001, vol. 20, 279-285.

International Search Report, international application No. PCT/US01/05630 (international filing date Feb. 22, 2001), mailed Jun. 4, 2001.

Takashi Idle, et al. "Hypolipidemic Effects of Guar Gum and Its Enzyme Hydrolysate in Rats Fed Highly Saturated Fat Diets" 1991 S. Karger Ag, Basel.

M. Kamen, et al., "Reduction in Diarrhea Incidence by Soluble Fiber in Patients Receiving Total or Suplemental Enteral Nutrition" Dept of Surgery University, Germany Jun. 20, 1964.

Gary A. Weaver et al "Dietary Guar Gum Alters Colonic Microbial Fermentation in Azoxymethane-Treated Rats" American Institute of Nutrition pril 1, 1996, p. 1979.

Hidehisa Takahashi et al. "Effect of Partially Hydrolyzed Guar Gum on Fecal Output in Human Volunteers" Nutrition Research, vol. 13 pp. 649, 1983.

A. Golay et al. "The effect of a liquid supplement containing guar gum and fructose n glucose tolerance in non-insulin-dependent diabetic patents" Nutr Metab Cardiovasc Dis (1995) pp. 141.

Hidehisa Takahashi et al. "Effect of Liquid Diets with or without partially Hydrolyzed Guar Gum on Intestinal Microbial Flora nd Function of Rats" Nutrition Research, vol. 15 No. 4, 1992.

Hidehisa Takahashi et al. "Influence of intact and partially hydrolysed guar gum on iron utilization i rats fed on iron-deficient diets" Comp, Biochem, Physical vol. 109A, pp. 75, 1993.

A. Golay et al. "The effect of a liquid supplement containing guar gum and fructose on glucose tolerance in non-insulin-dependent diabetic patients" NMCD Nutrition, Metabolism and Cardiovascular Diseases, vol. 5, Jun. 1995.

Hiroshi Hara et al. "Increases in calcium absorption with ingestion of soluble dietary fibre, guar-gum hydrolysate, depend on the casecum in partially nephrectomized and normal rats" British Journal of Nutrition (1996) pp. 773.

Brochure by Imperial Sensus LLC, "Product Data Sheets," "Facts about Inulin/FOS," "Frutafit Nutritional Information," "What is Frutafit". 1989.

Joanne Slavin "Commercially Available Enteral Forumulas with Fiber and Bowel Function Meastures" Nutrition in Clinical Practice 5:247-250, Dec. 1990.

Ueda et al. "Effects of Indigestible Dextrin on Blood glucose and Insulin Levels after Various Sugar Loads In Rats" J.Jpn. Soc. Nutr. Food Sci. 1993 (46).

John E. Greenleaf "Problem: thirst, drinking behavior, and involuntary dehydratin" Medicine and Science In Sports and Exercise pp. 645-656, 1973.

Elsworth R. Buskirk et al. "Body Fluid Balance" CRC Press, 1972.

Kazuhiro Ohkuma et al. "Pyrolysis of Starch and Its Digestibility by Enzymes—Characterization of Indigestibility Dextrin—" Matsutani Chemical Research Laboratories Denpun Kagaku, 1990 (37) 107-114.

Brochure by Matsutani Chemical Industry, "Fibersol-2-Physiological Attributes" Feb. 16, 1999.

Brochure by Matsutani America, Inc., "Matsutani's Products & Their Functionalities" May 1999.

"Hypochelesterolemic Effect of Sodium Propionate" J. Nutri. Sci. Vitaminol, vol. 41, No. 1, 1995, pp. 77, 78.

Novartis Nutrition Corporation "Benefiber Nutritional Data" Mar. 1999.

Novartis Nutrition Corporation "Novartis Products" Jan. 31, 2000.

Brochure by Matsutani Chemical Industry Col, Ltd., "Fibersol 2.", 1981.

Pamphlet by Imperial Sensus, LLC, "Inulin, A Natural Non-digestible Carbohydrate Having Healthy Influences for Preventing Disease—Occurrence, History, Preparation, Safety, Physiology and Related Health Implications" Version 23-10.29.99, 1997, 198, 1999.

* cited by examiner

WATER CONTAINING SOLUBLE FIBER

CROSS-REFERENCE TO RELATED APPLICATIONS

The present Application is a United States National Phase application of PCT/US01/05630, filed on Feb. 22, 2001 which was a Continuation-in-Part of the U.S. patent application Ser. No. 09/510,400 filed Feb. 22, 2000, now a U.S. Pat. No. 6,248,390 entitled "FIBER-WATER—WATER CONTAINING SOLUBLE FIBER," the contents of which are incorporated herein by reference in their entirety.

BACKGROUND

The present application concerns generally components of the human diet and more specifically water and fiber. Many of the major problems in human health revolve around which dietary components are truly essential for animal and human health and which components are merely hyped by various companies to sell product. A related problem is that of the accuracy of information regarding the appropriateness of a given food, nutrient or nutraceutical for a given individual. Certainly the "one size fits all" scenario is untrue when it comes to pharmaceuticals and nutrition. Further, the Federal Drug Administration has very little control over dietary supplements so that companies compete in making claims and launching new products, which may or may not be helping humans or animals that consume the products. New information constantly comes forth warning of potential interactions between herbal supplements, ethical pharmaceuticals and various disease states. The present inventor is concerned with providing a composition that can be extremely beneficial to humans and animals with few, if any, dangers or drawbacks. In the following description consumption by humans should also be taken to include consumption by domestic animals—primarily dogs and cats. While many of the concepts discussed are applicable to other animals, the digestive systems of herbivores, particularly ruminates, varies tremendously from that of humans. Therefore, the thrust of the present invention is towards carnivores and omnivores whose digestive systems more closely resemble those of humans.

One of the conundrums of human health is that dietary components, which may appear mundane are actually incredibly essential. One such vital component that is frequently overlooked, or given insufficient importance, is water. Although water is not metabolized, it is absolutely essential for metabolism. A majority of the weight of the body is water which serves as the solvent for the chemical reactions of life. Many living cells are more water than anything else. The various nutrients needed for cellular growth and survival enter the cells dissolved in water. After metabolism, the waste products are carried away by water, and death can occur in as little as three to five days without water.

It is generally agreed that the average person should consume at least eight, 8 oz. glasses of water per day—more if the individual is undergoing stress leading to an increased loss of water. Unfortunately, most people drink water, or appropriate hydrating drinks, only when they feel parched. Generally, they do not consume sufficient water to completely reverse dehydration. Further, this thirst response becomes even less effective as one ages. Older people are less likely to drink sufficient water and are more likely to suffer from dehydration. The reader's attention is drawn to "Problem: thirst, drinking behavior, and involuntary dehydration" by John E. Greenleaf (Medicine and Science in Sports and Exercise, 24:645 (1992).

When the body is dehydrated, nutrients cannot be as readily delivered to the cells, nor can waste products be as readily removed. With dehydration viscosity of the blood is increased so that efficiency of circulation is decreased. Such impaired circulation can ultimately lead to vascular damage and disease. At the same time because the dehydrated body seeks to reverse this situation, more water is removed from the bowel. This causes excessive compaction and hardness of digestive residues with resulting constipation and potential accumulations of toxins in the bowel (which toxins may ultimately be absorbed into the blood stream). Further, there is abundant evidence that constipation may lead to cancer of the colon possible as a result of prolonged contact between cells of the colon and toxin laden feces.

Because of the dehydrated situation of the body, filtration of wastes by the kidneys is reduced resulting in an even more significant buildup of toxic or waste products in the circulation. These wastes can exacerbate vascular damage while the high osmotic level of the blood and the high level of waste products can actually result in kidney damage. Of course, damaged kidneys are even less able to remove wastes and toxins. This results in a "chain reaction" where even more toxins and wastes accumulate and the overall damage becomes greater and greater.

Adequate intake of safe water can the basic problems of dehydration. By "safe water" the inventor means water that meets the safety standards for drinking water promulgated by the federal and state governments in the United States. In other countries appropriate governmental entities set the standards for "safe water." However, even with an adequate intake of water constipation and the damage it engenders continues to be a significant problem. This is due, in a large part, to the life style and diet of our industrialized society. Even with adequate intake of water, it is important that the food consumed have adequate "roughage."

Unquestionably as a society, we are suffering from a deplorable lack of dietary fiber. We are constantly warned by the medical profession and other experts that this lack of fiber can, and does, kill. Our diets are replete with "empty" calories—refined foods loaded with fats and sugars—and contain few whole foods. When it comes to fiber many believe that a daily bowl of cereal is adequate. Our supermarkets and pantries are stuffed with brightly packaged prepared foods that are usually fiber-free or very low in fiber. The presence or absence of dietary fiber greatly influences one's ability to expel solid wastes. About one in 19 individuals in our society has a health condition that requires special attention. This makes the need for adequate fiber even more important to many of these individuals. Due to modern medicine's success in combating contagious diseases we are living longer. But can we live healthier with calorie-laden over processed refined foods that lead to obesity? People try to cure these problems with miracle diets and by consuming a number of supplements in an attempt to replace what refining has removed from food.

Fiber or "roughage" is a component of food that remains undigested as it passes through the gastrointestinal system. The vast majority of dietary fiber consists of polysaccharides of plant origin. The most obvious fiber is the cellulosic wall that surrounds plant cells. Many of these cells are actually called "fibers" hence the original name of this component. However, there are actually two forms of fiber: insoluble fiber—the classic cellulosic material, and soluble fiber—water soluble polysaccharides that are not digested by human or carnivore digestive systems. Both types of fiber bind considerable water and, thus, have a softening effect on the stool. However, soluble fiber may, depending on the precise polysaccharides involved, may be metabolized or partially metabolized by bacteria in the colon. Thus, soluble fiber may not have the same bulking effect on the stool. Both type of fibers tend to increase motility within the gastrointestinal tract thus speeding transit time of wastes and lowering the risk of colon cancer. Like water fiber is essential for human health and is not metabolized by humans.

It has been discovered that dietary fiber appears to moderate the rate at which sugars and fats are absorbed from the intestine. The exact reason for this effect is not completely understood. Perhaps the fiber somehow sequesters these materials and thus slows or prevents absorption. Perhaps by speeding the overall transit of material through the digestive tract, absorption is slowed. In the case of simple sugars slowed absorption translates to a more gradual rise in blood sugar following eating. This is likely important in the managing of diabetes and may also help prevent adult onset diabetes. In the case of fats, the fiber seems to help prevent damaging levels of cholesterol in the blood. This may be due to a binding of bile salts and cholesterol to the fiber so that these materials are excreted with the feces rather than being absorbed or reabsorbed. Adequate fiber clearly lowers the risk of heart disease. Further, fiber tends to bind toxic metals and other toxins so that they are safely removed from the digestive system.

In fact, it has been suggested that deficiency in dietary fiber is related to numerous disease states including colon cancer, heart disease, cerebral apoplexy, appendicitis, and diabetes. This is apart from those diseases more closely linked to constipation such as intestinal toxemia, hemorrhoids, irritable bowel syndrome, colitis, diverticulitis, varicocele, and cholelithiasis (gall stones). It is believed that dietary fiber performs various useful physiological functions including reduction of serum cholesterol, limitation of insulin secretion, and acceleration of bowel evacuation. All these factors make fiber a very important nutritive substance, the sixth most important nutrient reported by some commentators, although it is not actually metabolized.

It would appear that any water-soluble non-metabolizable carbohydrate polymer could act as dietary fiber. It is important that no human enzymes are capable of hydrolyzing these polysaccharides into simple sugars that would readily absorbed so that the material would not provide a "fiber" effect. Preferentially, the polymers should also not be readily metabolized by bacteria common in the human gut because if bacteria do not metabolize them they will continue to provide a "bulking" effect. However some types of soluble fiber, like the carbohydrates of certain legumes, are metabolized by and do promote the growth of beneficial bacteria. This generally has a positive effect as the beneficial bacterial also tend to lubricate the stool and prevent the growth of other bacteria that may release toxins.

Soluble fiber comes from a wide range of plant sources. Water-soluble plant pectins and pectic materials, galactomannans, arabinogalactans and water-soluble hemicellulose can act as soluble fiber. Many plant "mucilages," gums, and soluble polysaccharides found in grains, seeds, or stems such as psyllium, guar, oat (beta glucans), astragalus (gum traganth), gum ghatti, gum karaya (Sterculia gum), and gum acacia are also soluble fiber. Algal polysaccharides such as agar or carrageenan also behave as soluble fiber as do other indigestible carbohydrates, such as maltodextrins or dextrins, produced by chemical or enzymatic digestion (e.g., partial hydrolysis) of starch, gums and other carbohydrate polymers. Soluble cellulosic ethers and other derivatives such as carboxymethy cellulose behave as soluble fiber as do indigestible carbohydrate polymers artificially prepared using bacterial enzymes. Non-digestible storage carbohydrates such as inulin are also important soluble fibers. A number of companies are now providing an entire range of "soluble fiber" materials. For example, TIC Gums of Belcamp, Md., Novartis Nutrition of Minneapolis, Minn. and Imperial Sensus of Sugar Land, Tex. provide soluble fiber compounds of food grade.

Soluble "fiber" is known to provide a novel opportunity for improving the characteristics of fiber-poor refined foods. Fiber was removed from food products because in many cases it made the foods coarse, unpalatable or difficult to process. Adding insoluble bran or other similar fiber to foods may provide more roughage but can also degrade the favorable properties of the foods. For example, cakes or pastries made from flours high in insoluble fiber may have inferior taste and texture. Excess insoluble fiber may upset the digestion and lead to a number of digestive problems. On the other hand, soluble fiber is generally well tolerated, often improves the texture or other physical characteristics of the food product and is generally innocuous. Consequently, there are a growing number of food products, ranging from baked goods to "shake-like" beverages, contain added fiber in the form of soluble fiber. Soluble fiber can restore the benefits of fiber to our highly refined diet.

There are a number of "medical" or laxative products on the market that are based on soluble fiber. Various different brands are based on psyllium seed carbohydrates or on soluble cellulose derivatives (e.g., carboxymethyl cellulose). These products are replete replete with sugas, dyes, artificial flavors, and artificial sweeteners. Generally, they do not comfortably fit into a "normal" diet. Usually they are powders that must be mixed with water to make a more or less thick, murky, slimy or even gritty solution. Further, their directions are rife with warnings such as "TAKING THIS PRODUCT WITHOUT ADEQUATE FLUID MAY CAUSE IT TO SWELL AND BLOCK YOUR THROAT OR ESOPHAGUS AND MAY CAUSE CHOKING. DO NOT TAKE THIS PRODUCT IF YOU HAVE DIFFICULTY IN SWALLOWING, IF YOU EXPERIENCE CHEST PAIN, VOMITING, OR DIFFICULTY IN SWALLOWING OR BREATHING AFTER TAKING THIS PRODUCT SEEK IMMEDIATE MEDICAL ATTENTION."

Despite the tremendous benefits of soluble fibers such a warning points out that dry packaged soluble fiber products are not the safest way to obtain soluble fiber. Fluid ingestion is an important, even vital, part of consuming soluble fiber. Further such a warning makes it clear that a safe and effective means for administration of soluble fiber is still needed because many consumers routinely disregard label directions and warnings.

SUMMARY

It is an object of the present invention to simultaneously provide both essential water and essential dietary fiber.

It is another object to safely provide an optimal combination of water and fiber—two essential elements of human health.

It is a further object of the present invention to provide soluble dietary in a form that guarantees that adequate water accompanies the fiber to render it optimally functional.

It is another object of the present invention to provide fiber and safe water in a simple/convenient, and pleasant to ingest format.

The present invention discloses a water-like fluid that contains water and dietary fiber. The water-like fluid, fiber-water, is a water composition comprising of safe water along with a significant quantity of soluble dietary fiber which is generally optically clear and has the physical properties similar to potable water. The fluid is intended as a replacement for bottled water, or other water, as a means to ensure the beneficial requirements of soluble fiber along with proper hydration. Depending on the soluble fiber used the fluid is either non-caloric or extremely low in calories. The amount of soluble fiber is adjusted so that consumption of an adequate amount of fluid to ensure hydration (e.g., eight 8 oz. glasses per day) will also provide an optimal amount of dietary fiber. This is particularly valuable in stressed situations were the diet may not provide adequate fiber without supplementation. The constant metered supply of fiber provided throughout the day may be preferable to and more convenient than "bolus" administration of fiber through laxatives, etc. Additionally, the constant presence of soluble fiber in the digestive tract provides the known beneficial effects of moderating the postprandial increase in blood glucose, modulating serum lipid levels, and suppressing appetite.

The present invention is prepared by dissolving any of a number of water-soluble polysaccharides in safe potable water. Either purified water or natural water (e.g., mineral water) can be used. However, because hydration is a major object of the invention, the base water should be relatively low in dissolved salts. Preferably the base water will not contain more than about 500 mg./l dissolved salts. This invention includes any soluble fibers, however, especially preferred are polysaccharides as refined dextrins or malto-dextrins produced from hydrolysis of starch (e.g., corn or potato starch, purified inulins (fructo-oligosaccharides) produced from plants such as dahlia or chicory, and partially hydrolyzed or otherwise fractionated vegetable gums such as partially hydrolyzed guar gum. A single or mixtures of several polysaccharides can be used depending on the precise use. The polysaccharides should be essentially indigestible although colon bacteria may metabolize them. If bacteria metabolize them, care should be taken that they are fermentable only by benign and beneficial bacteria.

One way of using the invention is to provide the proper daily requirement of fiber spread over the eight 8 oz. glasses of water recommended to insure proper hydration. The invention is also useful to provide fiber and water in enteral feeding situations and to provide fiber to children and infants. In some applications color may be added as an indicator of the amount of fiber present because different strengths of the fiber solution are contemplated. The material can be consumed directly or can be used in any food to which water must be added. It is also contemplated that the invention can be used to ensure hydration and regularity of domestic animals—primarily cats and dogs. However, any carnivore or omnivore should benefit from the invention. Herbivores have very different gut bacteria and may be able to metabolize the soluble fiber. Therefore, these animals must be tested on a case by case basis.

DESCRIPTION

The following description is provided to enable any person skilled in the art to make and use the invention and sets forth the best modes contemplated by the inventor of carrying out her invention. Various modifications, however, will remain readily apparent to those skilled in the art, since the general principles of the present invention have been defined herein specifically to provide a water-like drink containing significant amounts of soluble fiber.

The current trend in foods is to add fiber and soluble fiber to a variety of food products. There are, however, potential drawbacks to this trend. To be fully effective soluble fiber must be combined with an adequate intake of water—certainly not available in dry goods and baked goods. This is true for both soluble and insoluble fiber. Although the "shake-like" and other soluble fiber beverages or mixes to which water must be added do contribute water, they, like most dry goods, also contribute a significant source of calories to the diet—a major problem with today's diets and something clearly not needed by our generally overfed population. While it is possible to limit the caloric content of the fiber-containing beverages through the use of non-nutritive sweeteners, this amounts to adding chemicals that may create or exacerbate health problems. Therefore, the present inventor has developed a superior solution based on the unique synergistic interaction between water and soluble fiber.

In experimenting with various types of soluble fiber, the inventor noticed that a number of the more refined materials, such as lower molecular weight grades of inulin (for example see U.S. Pat. No. 5,968,365), specialized dextrins, maltodextrins and partially hydrolyzed guar gums can actually produce a clear, or virtually clear, and virtually colorless solution in water. Further, these soluble fibers are essentially tasteless at the preferred concentrations for consumption and essentially non-metabolized by the human digestive tract. [1] Thus is produced an entire new class of beverage—namely, "fiber-water." Dissolving appropriate water-soluble fiber to a concentration of generally 0.1-10% (by weight) produces fiber-water. The resulting product, fiber-water, is essentially water-like. Any of the soluble fiber materials listed above can be used individually or combined so long as the resulting

[1] Many of these materials contain a small component of metabolizable carbohydrate. For example, inulins often contain about 1.6 food calories per gram. This is a tiny fraction of the calories provided by a fully metabolizable carbohydrate. In many cases the exact amount of carbohydrate absorbed varies from person to person depending on age, weight, health condition, etc. The exact number of calories absorbed can be discovered only by careful metabolic analysis. However, the maximum number of absorbed calories will not exceed the maximum given for a specific fiber type (e.g., 1.6 food calories per gram for a specific inulin). product has the desired "water-like" characteristics—namely little or no taste, water-like viscosity, and few or no calories. Some of the carbohydrate polymers may contain small amounts of material that is absorbed and does contribute calories to human metabolism. However, the number of calories is small compared to the significant dietary fiber contributed and can be minimized by careful selection and blending of different soluble fiber materials.

Fiber-water is the perfect addition to the modern human diet as well as that of appropriate animals. It adds few, if any, calories and is readily substituted for bottled water as a safe source of hydration with necessary soluble fiber. In the intestines water is withdrawn from the intestinal contents, and as the effective concentration of soluble fiber increases the viscosity increasing and sequestering properties of the soluble fiber result in slowed absorption of sugars and altered absorption of fats. This is of major significance in diabetes, heart disease and certain other health conditions. Ultimately in the colon the hydrophilic properties of the soluble fiber have a softening and bulking effect on the stool. Thus, fiber-water is a unique, consistent, safe, easy to use single product that simultaneously ameliorates the problems of dehydration and constipation. Further, there are indications that the viscosity enhancing and carbohydrate absorption—slowing properties of the soluble fiber result in appetite suppression both by creating a feeling of fullness and by moderating swings in blood sugar. The literature is filled with positive effects of fiber on weight control both in humans and domestic animals. Thus, the material is not only non-caloric or very low caloric but has additional positive effects on weight control.

Although the inventor contemplates fiber-water as a direct way to add water and fiber to the diet, it is also a feature of the invention that it can also be used to add fiber to other foods. For example, any packaged food or beverage can be reconstituted with fiber-water to yield a fiber-enhanced food or beverage. Because fiber-water is based on safe water, it results in a safe food and/or beverage product even if the product is not heated to destroy microbes. Soluble fiber polysaccharides are generally known to be stable during the cooking process. This means that if fiber-water is used to cook foods, such as grains (rice), oatmeal, and legumes, that imbibe water during the cooling process, these foods will also become fiber enhanced. Fiber can readily be added to all types of packaged foods including gelatin products and canned concentrated foods such as soups. Further, since fiber-water is heat stable it can be used to prepare fiber enriched hot beverages. In addition, it can be frozen to provide "fiber ice cubes/products."

An important aspect of fiber-water is that it preferably has a "water-like" appearance. By this the inventor means that the solution is essentially clear. People tend to relate clear solutions to purity. Some soluble fiber materials yield a cloudy or murky solution. It is preferred that fiber-water utilize materials that yield essentially clear solutions. As already mentioned, several available non-digestible carbohydrates produce "water clear" solutions. Generally partial hydrolysis or fractionation of the soluble fiber materials, already discussed (e.g. partially hydrolyzed guar gum), will lead to clearer solutions. To date many manufacturers of soluble fibers have been concerned with using their products in solid foods where texture of the ingredient is most important. Therefore, there has been little effort in producing materials that make clear solutions.

Besides, universal use as a hydrating and fiber providing material fiber-water is especially useful in situations of stress. It is believed that stress, both physiologically and psychologically, wrecks havoc on the body and alters or effects bowel regularity. When under stress humans and animals are known to reduce their consumption of water. When the body is stressed by disease it actually requires additional water yet this is exactly when many individuals reduce their water/fluid intake. Further, stress may influence people to prefer sugar laden beverages, comfort type foods, or caffeinated beverages for alertness. These types of beverages actually increase ones water requirement and may actually lead to dehydration. Thus it is beneficial to provide fiber-water, as opposed to plain water, as part of emergency supplies which are kept on hand and are used in "natural disaster" situations—fire, flood, storm, earthquake, or hurricane. During such an disasters people are stressed, and often forced to move from their homes. Emergency situations often dictate shortages of food (including beverages/water) and/or the predictability as to when they may be available. This, combined with the general shortage of fresh fruits and vegetables, a key source of dietary fiber, during such an emergency naturally leads to loss of regularity. Emergency food drops rarely contain fresh fruits and vegetables. Having to deal with the emergency is bad enough. Adding severe constipation and/or dehydration simply makes a bad situation worse. Assuring ample supplies of fiber-water is intended to alleviate many of these problems.

Natural catastrophes and emergencies are certainly a source of stress as are medical problems. Numerous and varied medical conditions, both short tern and long term, may require feeding an individual through a tube. The two types of tubes used most commonly are the naso-gastric tube and the gastrostomy tube. In either case nutriments are supplied directly into the stomach. Great efforts have been made by major corporations to provide good nutritional products for tube feeding. Depending on the design of the particular tube, viscosity of the feeding liquid may be a problem. The present inventor is a named inventor on U.S. Pat. Nos. 4,315,513 and 4,393,873 for a percutaneous tube containing a one way valve-and is an expert on the potential problems of tube feeding.

Depending on the specific medical condition and/or severity of the problem, dehydration and constipation may remain constant problems. Sufficient hydration and more specifically the ingestion of sufficient water are most often a problem. Nasal tubes often irritate the throat. Even though there have been continuing efforts to create tube feeding formulae, commercial products are often low in fiber. Also, liquid foods capable of passing through a tube are frequently high in calories and low in fiber. Some patients may have a high requirement for calories but others do not. Therefore, one may administer excess calories in an attempt to provide adequate fiber. The solution is to supplement the feeding regime with fiber-water rather than plain water. Fiber-water as described herein is very low in viscosity so that it is simple to administer. For hospital use the inventor contemplates providing fiber-water in a number of different grades—that is with different strengths/quantities of fiber. In this way a grade can be selected that will provide the optimum amount of both fiber and water adjusted to meet the patient's needs. It is further contemplated that the grades could each be uniquely colored with a safe soluble food-grade color so that hospital personnel, or other caregiver, could readily recognize which grade of fiber-water was being administered. This would further ensure that the correct grade was used for a particular patient. Additionally, color might be pleasing to the patient, especially a child patient, and thus may serve to distract the child from an unpleasant situation. Further, these tubes are not always permanent, and if the fiber-water experience is pleasant and convenient perhaps new drinking habits will be instilled and carried forward.

Although the above discussion presupposes that the primary user of fiber-water would be an adult, children and infants, as well, have significant fiber requirements. Children, as well as adults, are victims of the American diet, which is notoriously deficient in fiber rich fruits and vegetables. Consciously or not, many parents have taught their children to reject foods that are brown, speckled or have significant textures. It is important that parents, as care givers, become aware of the amount of fiber consumed by their children. Children can benefit from optimal hydration based on fiber-water. By helping control appetite it may help control childhood obesity. It may even be of aid with eating disorders such as anorexia or bulimia since victims of these disorders are known to drink water because it lacks calories. Fiber-water would at least help preserve proper functioning of the gastrointestinal tract while other treatment is undertaken.

At every stage of life fiber is vital to proper health and growth and development. Infants and toddlers require a regular and controlled source of fiber. After babies cease to breast-feed or use liquid formulas and move on to more varied "adult" solid foods, they often suffer a number of painful digestive episodes which makes them fussy and difficult. Fiber-water provides an ideal source of hydration for such infants because it ensures adequate hydration, and it also provides a consistent fiber source guaranteeing regularity. It should be kept in mind that typical commercial baby foods may vary widely in the amount of fiber provided. Fiber-water provides an opportunity to lay the foundation of good habits of hydration and fiber intake.

Domestic animals, particularly cats and dogs, also suffer from problems with hydration and constipation. Dogs are omnivorous and will naturally consume some fruits and vegetables. However, refined dog foods tend to be remarkably deficient in vegetable fiber. Administering a source of fiber-water daily since dogs generally drink offered water can readily alleviate this problem. An alternative is to add the fiber water to dry kibble (of the "gravy" forming type) or even stir it into canned dog food. Because fiber-water is essentially flavorless, it is well tolerated by dogs. Cats also have serious dehydration and constipation problems. Cats are obligate carnivores and generally will not knowingly consume fruits or vegetables. Kidney failure is a common malady of geriatric cats resulting, in part, from inadequate hydration. Constant vomiting is a common feline problem brought on by their grooming during which they ingest significant quantities of fur. In the wild cats ingest sufficient indigestible matter (bones, cartilage and tendons) to provide non-vegetable "fiber." With pet cats the owners are expected to mix fiber (generally psyllium) with the cat's food or administer petroleum-based laxatives. Neither alternative is particularly ideal. Fiber-water can be given as water or mixed with the cat's food to provide sufficient fiber to prevent both hairballs and constipation thus solving significant feline problems. It appears that reduction in vomiting positively contributes to the hydration of cats.

EXAMPLE 1

It has been estimated that adult fiber requirements are between about 10 grams and about 40 grams per day. Some experts have adopted a figure of around 25 grams. Obviously, the requirement for fiber is related to body size, weight and health status. Some attempts have been made to relate the requirement to weight. It has been estimated that between 50 and 300 mg. of fiber per kilogram of body weight per day. Fiber requirements can also be estimated from daily caloric intake. Current estimates call for about 25 grams per day for a 2,000 calorie diet (adequate for a 125 pound person) and about 37 grams for a 3,000 calorie diet (adequate for a 175 pound person). Both approaches yield roughly similar results since a heavier person usually has a greater caloric intake. These estimates should provide adequate fiber for even a person with a very fiber deficient diet.

Taking a 25 g of fiber per day requirement and using the rubric of 8 glasses of water (each glass equals approximately 250 ml of water) one should spread the 25 g over 2,000 ml (8×250 ml). Therefore, the fiber-water used should contain 12.5 mg/ml of soluble fiber or approximately 1.25% by weight fiber-water. For a daily caloric intake of 3,000 calories this translates to a fiber-water of about 2% by weight soluble fiber.

This analysis indicates that at least two different "strengths" of fiber-water should be produced to allow a range of average persons receive both the optimum amount of water and fiber. In actuality, it is convenient to produce a number of grades ranging from about 0.50% to 2.5%. This would allow a wide range of individuals to readily select a fiber-water that simultaneously supplies both the required amount of water and the required amount of fiber. Depending on an individuals needs combined with the desire to drink, or not to drink, the amount of fiber can be increased by using an appropriate "strength/grade" of fiber-water to supply some or all of the required eight glasses of water. Of course, it is also possible that an individual does not intend to spread out the fiber requirement over eight 8 oz. glasses. It may be desirable to consume the fiber at home, in the morning and evening only and not away from home. For this and similar reasons, it is desirable to make several more concentrated grades of fiber-water ranging from 5% to even 10% by weight fiber. This will reduce the number of daily doses needed. Thus, if one does not have fiber-water available all day, hydration can be assured by drinking plain water supplemented with a higher "strength/grade" of fiber-water to fulfill daily fiber requirements. If necessary, the amount of fiber consumed can be a lower "strength/grade" of fiber-water to meat the daily required eight glasses of water. Colors can be used to indicate different "strength/grades" of fiber in the water. It may also be advantageous to add a different food color to each grade so that the "strength" of the fiber-water can be identified at a glance.

Fiber-water for testing, according to the above scheme, was produced by dissolving the required weights of a mixture of indigestible dextrins and partially hydrolyzed guar gum in purified water. The preferred dextrins or maltodextrins are prepared by controlled hydrolysis of vegetable starches (e.g. potato or corn) as is described in U.S. Pat. No. 5,620,873. The hydrolyzed guar gum is of the type discussed in U.S. Pat. No. 5,260,279 (available in the United States as BENEFIBER® from Novartis Nutrition of Minneapolis, Minn.; available in other countries as SUN-FIBER® from Taiyo of Japan). The resulting solution, (fiber-water) in the strengths explained above, is essentially colorless and clear having the basic appearance of plain water. The liquid is either flavorless or may have a very slight "sweetness" depending on the strength of the particular solution and the proportion of the soluble fibers used. The partially hydrolyzed guar gum is essentially flavorless while the maltodextrin has a slight sweet taste. In addition, some individuals can detect a slightly different "mouth feel" because of the slight viscosity increase resulting from the soluble fibers.

However, for all practical purposes the resulting solution looks and behaves like bottled water and can readily be used in place of bottled water. If it is desired to ensure the microbial status of the fiber-water, it can be autoclaved or sterile filtered like plain water. Starting with a good quality drinking water preferably one with little or no sodium can ensure palatability. Addition of trace of "essence" or flavor such as lime or lemon can enhance palatability without adding any calories or otherwise detracting from the beneficial properties of the product. The product should look, behave and be used like high quality drinking water. To this end any "naturally occurring" water can be used as a starting. Thus, it is possible to start with a mineral water and produce "fiber mineral water." Such mineral waters may have up to 500 mg/L of dissolved salts.

EXAMPLE 2

Infants also have distinct fiber requirements. Until recently, no specific guidelines for dietary fiber in children were available. Recommendations have recently been developed, based on age, weight, and height of the child. It is now recommended that children older than two years consume a minimum amount of fiber equal to the age plus five grams a day. The recommended "safe dose" is between this and age plus ten grams a day. Above that symptoms of excess fiber (e.g., loose stool) may become apparent. It is the intent of the various grades of fiber-water provided in the present invention to enable a person or a caregiver to "titrate" the amount of fiber by looking for symptoms of excess fiber consumption. Since infants and small children are generally unable to directly tell us of their digestive distress, constipation and other results of inadequate fiber are often exhibited as fussiness or similar undesirable behavior. This is especially true when infants are just being weaned from fiber-free milk to a fiber containing diet. There can be significant advantage to providing a fiber source in the water consumed by the infant. Because infants have a constant requirement for water the addition of fiber-water to the typical diet can provide a more constant, even source of fiber while ensuring adequate hydration. Further, the use of fiber-water can ensure adequate fiber without adding significant calories— an inevitable consequence of other fiber sources. Consistent dietary fiber can provide for more even operation of the infant's digestive process. In contrast, a more traditional infant diet is one that alternates between low fiber formula and high fiber "adult" foods may have an uneven or cramping effect.

A useful amount of soluble fiber is ¼-1 gram per 8 oz (a considerably lower concentration than for the adult fiber-water). The "baby fiber-water" is produced by dissolving the required amount of soluble fiber consisting of a mixture of partially hydrolyzed guar gum and inulin (FRUTAFIT® from Imperial-Sensus of Sugar Land, Tex. is a preferred inulin for this purpose) in safe (e.g., purified) water. The slight sweetness of the inulin makes the water especially palatable. The intent here is not to treat specific diseases but to ameliorate constipation—and only disease states known to cause constipation. For example, Hirshprung's syndrome is caused by a loss of motor cells in the lower rectum; therefore there is a loss of thrust. Children born with congenital problems, or children still suffering from incompletely healed accidents, benefit from fiber-water as it provides bulk and hydration to help overcome serious constipation that may result from such causes. Actually babies are extremely sensitive to a variety of stresses and changes and get constipated as a result. Alternating bouts of regularity and or constipation is not uncommon. A baby's system may be under stress, and that alone can be the cause. Infants can sense stress in their surroundings be it the home, etc.:

1) Dysfunctional: homes where there is divorce, alcoholism, family abuse etc., may be noted in the babies refusal to eat, defecate, crying spells etc.
2) Changes in custodial care: baby sitters, new sibling, and or step parent etc.
3) Changes due to normal childhood illnesses: colds, flu, teething, fever, measles, mumps, chicken pox, etc. While these illnesses may not be the direct cause of constipation they may be the indirect cause. With illness come changes in eating, sleeping, behaviors, and habits.
4) Travel: When a babies environment is changed, from going to grandparents to international travel, sensitivities to the new can throw off a system that is used to regularity. International travel bears with it the dehydration of long hours on an airplane etc. The future holds even more stressing travel such as space travel.
5) Accidents: also upset regular habits and can result in constipation.

Water probably can be given to the baby as early as one month, although it's not usually started between 2-4 months after birth. In some instances fiber-water may be of especially significant value. Fiber-water can serve as a great pacifier without the dangers of dental harm posed by traditional formula or beverages. Diarrhea, which is often caused by contaminated water supplies, can be life threatening to infants. Therefore, there are great advantages to using safe bottled water for any infant formula, etc. Using safe packaged fiber-water is even better where it is desired to avoid excessive caloric intake. In the case of the "fat baby", the fiber-water may well do more than provide a low or non caloric, hydrating agent. The soluble fiber in fiber-water has been shown to slow the absorption of fats and sugars. Therefore, the fiber-water may also help to counteract an overly rich diet.

As the infant becomes a toddler and moves towards more a more adult diet, the requirement for fiber increases. Fiber-water again serves as the ideal source of both hydration and fiber. Unlike soft drinks or fruit juices fiber-water does not add calories to the diet nor does it cause dental caries. It is most convenient to package toddler/young child fiber-water in flexible pouches or laminate boxes because these containers are shatter proof and can be easily used by small children. As with adult fiber-water, it is advantageous to provide the infant and child fiber-water in a number of "grades" so that the amount of fiber administered can be readily adjusted. Again, it is advantageous to add identifying color so that it is apparent to the parent precisely which grade of fiber-water is being used. In the case of children the color is inherently appealing and may mitigate in favor of using transparent packaging so that the child can appreciate the color of the fiber-water being consumed.

It is permissible and often advantageous to blend an assortment of different soluble fibers to create any particular fiber-water. It is believed that the various soluble fibers have essentially identical properties when it comes to providing bulk and hydration to the stools. However, it is not yet clear which soluble fibers will prove superior in altering lipid or sugar absorption. Of the soluble fibers presently available the indigestible dextrins, inulins and partially hydrolyzed guar gum appear to provide the most "water clear" solutions. However, many dextrins and inulins contain a small amount of a metabolizable component and have a slight sweet taste. Therefore, there can be an advantage of providing a portion of the soluble fiber in the form hydrolyzed guar gum or some other flavorless and totally non-metabolizable compound. Even though some of these materials may produce a less clear solution, a combination with a "clear" soluble fiber can yield a solution that is both high in fiber and clarity and low in sweetness or other taste. Other soluble fibers can be combined to realize the advantages of the different fibers. Inulins have a slightly sweet taste and while not appreciably metabolized by humans, bacteria in the colon metabolize inulins. In some cases such colonic metabolism may provide a distinct advantage and would mitigate towards including inulins in the mixture. Until the advent of fiber-water the advantage of a clear or nearly clear soluble fiber was not appreciated. As mentioned above, it is anticipated that partial hydrolysis and fractional refining of the various soluble fibers mentioned above will rapidly lead to a greater variety of "water clear" soluble fibers.

The present invention discloses the hitherto unappreciated advantages of using fiber-water as an essentially non-caloric source of fiber and water. In other words, a new dietary component that simultaneously provides hydration and dietary fiber. While the examples have dealt with prepackaged fiber-water, there is nothing that precludes fiber-water from being prepared by the end user from a concentrated source of soluble fiber and potable water. The soluble fiber can be in the form of a powder or a slurry/suspension or a concentrated solution or syrup to which a predetermined quantity of water is added. In the past such fiber sources have been added to solid food items and to various beverages. However, such concentrated sources of fiber have never been used to prepare potable fiber-water for direct consumption as a water comprising of safe water and soluble dietary fiber.

In addition to the equivalents of the claimed elements, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope and spirit of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A water composition consisting essentially of safe water and one or more water-soluble indigestible fibers, selected from a group consisting of inulin, dextrin, maltodextrin and partial hydrolyzates of the fibers from said group, forming a solution whose physical properties are similar to potable water, where total fiber constitutes at least 0.1 to 10% by weight of said solution.

2. The water composition of claim 1 further comprising a soluble food grade color.

3. The water composition of claim 2, wherein the soluble food grade color acts as an indicator of an amount of the water soluble indigestible fiber contained in the water composition.

4. The water composition of claim 1, wherein the amount of said watersoluble fiber is selected to satisfy simultaneously both hydration requirements and fiber requirements when consumed.

5. A method of managing bowel regularity comprising the step of ingesting a quantity of the water composition of claim 1.

6. A method of managing hemorrhoids comprising the step of ingesting a quantity of the water composition of claim 1.

7. A method of avoiding assimilation of toxic bowel compounds comprising the step of ingesting a quantity of the water composition of claim 1.

8. A method of managing diabetes comprising the step of ingesting a quantity of the water composition of claim 1.

9. A method of managing obesity comprising the step of ingesting a quantity of the water composition of claim 1.

10. A method of suppressing appetite comprising the step of ingesting a quantity of the water composition of claim 1.

11. A method of lowering serum cholesterol levels comprising the step of ingesting a quantity of the water composition of claim 1.

12. The water composition of claim 1, wherein said composition contains fewer than 500 mg/l of soluble salts.

13. The water composition of claim 1 wherein said composition forms an optically clear solution.

* * * * *

(12) EX PARTE REEXAMINATION CERTIFICATE (7701st)
United States Patent
Stillman

(10) Number: US 7,238,380 C1
(45) Certificate Issued: Aug. 24, 2010

(54) WATER CONTAINING SOLUBLE FIBER

(76) Inventor: Suzanne Jaffe Stillman, 1712 Barrington Ave. #4, Los Angeles, CA (US) 90025

Reexamination Request:
No. 90/009,254, Aug. 19, 2008

Reexamination Certificate for:
Patent No.: 7,238,380
Issued: Jul. 3, 2007
Appl. No.: 10/204,572
Filed: Apr. 2, 2003

Related U.S. Application Data

(63) Continuation-in-part of application No. 09/510,400, filed on Feb. 22, 2000, now Pat. No. 6,248,390.

(51) Int. Cl.
*A23L 1/304* (2006.01)

(52) U.S. Cl. .............. 426/590; 426/2; 426/74; 426/599; 426/648; 514/40

(58) Field of Classification Search ................. None
See application file for complete search history.

(56) References Cited

U.S. PATENT DOCUMENTS

| | | |
|---|---|---|
| 2,224,252 A | 12/1940 | Callaway |
| 3,009,859 A | 11/1961 | Laborit et al. |
| 3,111,641 A | 11/1963 | Sperti et al. |
| 3,227,562 A | 1/1966 | Houghtaling et al. |
| 3,337,404 A | 8/1967 | Polli et al. |
| 3,564,740 A | 2/1971 | Calfee |
| 3,908,024 A | 9/1975 | Wankler |
| 3,939,283 A | 2/1976 | Billington |
| 4,034,493 A | 7/1977 | Ball |
| 4,042,684 A | 8/1977 | Kahm |
| 4,154,814 A | 5/1979 | Hand et al. |
| 4,167,587 A | 9/1979 | Danforth |
| 4,187,194 A | 2/1980 | Wellman et al. |
| 4,211,668 A | 7/1980 | Tate |
| 4,217,370 A | 8/1980 | Rawlings et al. |
| 4,283,432 A | 8/1981 | Mitchell et al. |
| 4,309,417 A | 1/1982 | Staples |
| 4,315,513 A | 2/1982 | Nawash et al. |
| 4,393,873 A | 7/1983 | Nawash et al. |
| 4,444,761 A | 4/1984 | Spiller |
| 4,447,532 A | 5/1984 | Coker et al. |
| 4,448,770 A | 5/1984 | Epting, Jr. |
| 4,497,793 A | 2/1985 | Simkin |
| 4,689,235 A | 8/1987 | Barnes et al. |
| 4,711,784 A | 12/1987 | Yang |
| 4,738,856 A | 4/1988 | Clark |
| 4,749,575 A | 6/1988 | Rotman |
| 4,777,042 A | 10/1988 | Toda et al. |
| 4,778,677 A | 10/1988 | Ebbesen |
| 4,784,861 A | 11/1988 | Gori |
| 4,834,990 A | 5/1989 | Amer |
| 4,849,222 A | 7/1989 | Broaddus |
| 4,911,889 A | 3/1990 | Leland et al. |
| 4,953,572 A | 9/1990 | Rose et al. |
| 4,988,530 A | 1/1991 | Hoersten et al. |
| 4,996,063 A | 2/1991 | Inglett |
| 5,002,934 A | 3/1991 | Norton et al. |
| 5,009,819 A | 4/1991 | Popescu et al. |
| 5,019,400 A | 5/1991 | Gombotz et al. |

(Continued)

FOREIGN PATENT DOCUMENTS

| | | |
|---|---|---|
| FR | 2586532 | 3/1987 |
| JP | 59051741 A | 3/1984 |
| JP | 10-09520 | 1/1989 |
| JP | H 02-154673 | 6/1990 |
| JP | 02-154673 | 6/1990 |
| JP | 4-311378 A | 11/1992 |
| JP | H5-17503 | 1/1993 |
| JP | 05-017503 | 1/1993 |
| JP | H06-90703 | 4/1994 |
| JP | 06-090703 | 4/1994 |

(Continued)

OTHER PUBLICATIONS

Information Access Company, http://www.funding-universe.com, Company History, pp. 1–4, Nov. 17, 2009.*

Delta Communications Group, htto://www.delta-comm.com, 1 page, Nov. 17, 2009.*

Total dissolved solids in Drinking–water, Guidelines for drinking–water quality, 2nd ed. vol. 2, Health criteria and other supporting information. World Health Organization, Geneva, 1996.*

Electronic code of Federal Regulations, Title 21: Food and Drugs, Part 165.110 Bottled Water, Jul. 6, 2009.*

Chemical Database: Picloram, EnvironmentalChemistry.com, http://www.environmentalchemistry.com, Nov. 17, 2009, 1–3.

Morrison & Boyd, "Acidity of Phenols", Organic Chemistry, 3rd Edition, Allyn and Bacon, Inc., Boston, 1973, 797–799.

Cordoba, et al., "Chondroitin Sulfate and Other Sulfate Containing Chondroprotective Agents . . . ", Osteoarthritis and Cartilage, 2003 v. 11 p. 228.

(Continued)

*Primary Examiner*—Brenda Brumback

(57) ABSTRACT

A water-like fluid containing safe water and a significant quantity of soluble dietary fiber. The resulting solution is generally optically clear and has physical properties similar to potable water. The fluid is intended as a replacement for bottled, or other water, as a means to ensure proper hydration. Depending on the soluble fiber used the fluid is either non-caloric or extremely low in calories. The amount of soluble fiber is adjusted to a specific amount of water so that consumption of an adequate amount of fluid ensures hydration (e.g., eight 8 oz. glasses per day) will also providing an optimal amount of dietary fiber. This is particularly valuable in stressed situations where the diet may not provide adequate fiber without supplementation. The constant metered supply of fiber provided throughout the day is preferable to, and more convenient than, "bolus" administration of fiber through laxatives, etc. Additionally, the constant presence of soluble fiber in the digestive tract provides the known beneficial effects of moderating the postprandial increase in blood glucose, modulating scrum lipid levels, and suppressing appetite.

U.S. PATENT DOCUMENTS

| | | |
|---|---|---|
| 5,019,594 A | 5/1991 | Wurtman et al. |
| 5,024,842 A | 6/1991 | Edgren et al. |
| 5,032,411 A | 7/1991 | Stray-Gundersen |
| 5,051,261 A | 9/1991 | McGinity et al. |
| 5,055,460 A | 10/1991 | Friedlander |
| 5,077,057 A | 12/1991 | Szoka, Jr. |
| 5,082,673 A | 1/1992 | Inglett |
| 5,108,774 A | 4/1992 | Mills et al. |
| 5,126,332 A | 6/1992 | Ohta et al. |
| 5,149,541 A | 9/1992 | Leis, Jr. et al. |
| 5,162,128 A | 11/1992 | Mills et al. |
| 5,178,896 A | 1/1993 | Langner |
| 5,209,978 A | 5/1993 | Kosaka et al. |
| 5,215,750 A | 6/1993 | Keane, II |
| 5,219,570 A | 6/1993 | Barbera |
| 5,223,268 A | 6/1993 | Stetski et al. |
| 5,225,219 A | 7/1993 | Inglett |
| 5,229,117 A | 7/1993 | Leland et al. |
| 5,229,172 A | 7/1993 | Cahalan et al. |
| 5,260,279 A | 11/1993 | Greenberg |
| 5,260,873 A | 11/1993 | Hishinuma |
| 5,270,297 A | 12/1993 | Paul et al. |
| 5,273,754 A | 12/1993 | Mann |
| 5,294,458 A | 3/1994 | Fujimori |
| 5,294,606 A | 3/1994 | Hastings |
| 5,300,310 A | 4/1994 | Elsen |
| 5,334,824 A | 8/1994 | Martinez |
| 5,344,824 A | 9/1994 | Ohkuma et al. |
| 5,358,729 A | 10/1994 | Ohkuma et al. |
| 5,364,652 A | 11/1994 | Ohkuma et al. |
| 5,374,444 A | 12/1994 | Langner |
| 5,378,474 A | 1/1995 | Morella et al. |
| 5,380,717 A | 1/1995 | Ohkuma et al. |
| 5,397,786 A | 3/1995 | Simone |
| 5,405,836 A | 4/1995 | Richar et al. |
| 5,422,352 A | 6/1995 | Astrup |
| 5,430,141 A | 7/1995 | Ohkuma et al. |
| 5,447,730 A | 9/1995 | Greenleaf |
| 5,456,985 A | 10/1995 | Zgoulli et al. |
| 5,458,893 A | 10/1995 | Smith |
| 5,472,732 A | 12/1995 | Ohkuma et al. |
| 5,505,981 A | 4/1996 | Wakabayashi et al. |
| 5,516,535 A | 5/1996 | Heckert et al. |
| 5,519,011 A | 5/1996 | Wakabayashi et al. |
| 5,531,734 A | 7/1996 | Geckle et al. |
| 5,533,973 A | 7/1996 | Piontek et al. |
| 5,543,405 A | 8/1996 | Keown et al. |
| 5,550,113 A | 8/1996 | Mann |
| 5,558,897 A | 9/1996 | Goldman |
| 5,567,424 A | 10/1996 | Hastings |
| 5,571,441 A | 11/1996 | Andon et al. |
| 5,587,197 A | 12/1996 | Maeda et al. |
| 5,597,604 A | 1/1997 | Chalupa et al. |
| 5,605,697 A | 2/1997 | Asano et al. |
| 5,612,026 A | 3/1997 | Diehl |
| 5,620,873 A | 4/1997 | Ohkuma et al. |
| 5,653,996 A | 8/1997 | Hsu |
| 5,672,301 A | 9/1997 | Orly et al. |
| 5,681,606 A | 10/1997 | Hutchison et al. |
| 5,698,437 A | 12/1997 | Matsuda et al. |
| 5,700,484 A | 12/1997 | Chauffard et al. |
| 5,721,345 A | 2/1998 | Roberfroid et al. |
| 5,721,354 A | 2/1998 | Spaete et al. |
| 5,753,295 A | 5/1998 | Goldman |
| 5,755,688 A | 5/1998 | Piontek et al. |
| 5,776,524 A | 7/1998 | Reinhart |
| 5,780,060 A | 7/1998 | Levy et al. |
| 5,789,393 A | 8/1998 | Dressman et al. |
| 5,792,754 A | 8/1998 | Green et al. |
| 5,810,018 A | 9/1998 | Monte |
| 5,824,353 A | 10/1998 | Tsunoda et al. |
| 5,851,578 A | 12/1998 | Gandhi |
| 5,880,109 A | 3/1999 | Nakamura et al. |
| 5,891,465 A | 4/1999 | Keller et al. |
| 5,900,251 A | 5/1999 | Raissen |
| 5,904,851 A | 5/1999 | Taylor et al. |
| 5,922,346 A | 7/1999 | Hersh |
| 5,922,350 A | 7/1999 | Janoff et al. |
| 5,935,826 A | 8/1999 | Blue et al. |
| 5,958,456 A | 9/1999 | Baichwal et al. |
| 5,958,491 A | 9/1999 | Knueven |
| 5,958,497 A | 9/1999 | Grimm et al. |
| 5,962,015 A | 10/1999 | Delrieu et al. |
| 5,968,365 A | 10/1999 | Laurenzo et al. |
| 5,968,569 A | 10/1999 | Cavadini et al. |
| 5,972,415 A | 10/1999 | Brassart et al. |
| 5,976,603 A | 11/1999 | Kota et al. |
| 5,977,175 A | 11/1999 | Lin |
| 5,985,282 A | 11/1999 | Haveson |
| 5,989,574 A | 11/1999 | Slavin |
| 5,993,880 A | 11/1999 | Frost et al. |
| 5,997,917 A | 12/1999 | Uchida et al. |
| 6,001,554 A | 12/1999 | Boyle et al. |
| 6,004,610 A | 12/1999 | Wang et al. |
| 6,007,838 A | 12/1999 | Alving et al. |
| 6,007,872 A | 12/1999 | Lindhe et al. |
| 6,013,622 A | 1/2000 | Bruno et al. |
| 6,017,550 A | 1/2000 | Berk et al. |
| 6,020,002 A | 2/2000 | Myers et al. |
| 6,020,016 A | 2/2000 | Castleberry |
| 6,022,500 A | 2/2000 | John et al. |
| 6,022,525 A | 2/2000 | Sutton et al. |
| 6,030,605 A | 2/2000 | D'Ameila et al. |
| 6,033,713 A | 3/2000 | Sheldon |
| 6,033,888 A | 3/2000 | Batich et al. |
| 6,039,952 A | 3/2000 | Sunvold et al. |
| 6,042,854 A | 3/2000 | Morris et al. |
| 6,077,504 A | 6/2000 | Cavaliere ved. Vesley et al. |
| 6,077,872 A | 6/2000 | Yu et al. |
| 6,102,224 A | 8/2000 | Sun et al. |
| 6,120,803 A | 9/2000 | Wong et al. |
| 6,133,323 A | 10/2000 | Hayek |
| 6,180,099 B1 | 1/2001 | Paul |
| 6,180,131 B1 | 1/2001 | Sunvold et al. |
| 6,190,591 B1 | 2/2001 | Van Lengerich |
| 6,193,999 B1 | 2/2001 | Gennadios |
| 6,204,291 B1 | 3/2001 | Sunvold et al. |
| 6,235,320 B1 | 5/2001 | Daravingas et al. |
| 6,248,390 B1 | 6/2001 | Stillman |
| 6,261,589 B1 | 7/2001 | Pearson et al. |
| 6,265,450 B1 | 7/2001 | Asami et al. |
| 6,296,892 B1 | 10/2001 | Elseviers et al. |
| 6,313,558 B1 | 11/2001 | Abukawa et al. |
| 6,328,967 B1 | 12/2001 | Rivera |
| 6,355,274 B1 | 3/2002 | Dartey et al. |
| 6,365,209 B2 | 4/2002 | Cherukuri |
| 6,368,629 B1 | 4/2002 | Watanabe et al. |
| 6,368,633 B1 | 4/2002 | Lou et al. |
| 6,383,534 B1 | 5/2002 | Dyrr et al. |
| 6,399,090 B1 | 6/2002 | Shehadeh |
| 6,399,124 B1 | 6/2002 | Lesens et al. |
| 6,403,657 B1 | 6/2002 | Hinz |
| 6,406,730 B1 | 6/2002 | Banyard et al. |
| 6,410,061 B1 | 6/2002 | Morre et al. |
| 6,410,521 B1 | 6/2002 | Mundy et al. |
| 6,410,522 B1 | 6/2002 | Ruenberg |
| 6,410,685 B1 | 6/2002 | Masuyama et al. |
| 6,413,558 B1 | 7/2002 | Weber et al. |
| 6,416,800 B1 | 7/2002 | Weber et al. |
| 6,416,806 B1 | 7/2002 | Zhou |
| 6,420,350 B1 | 7/2002 | Fleischner |

| | | |
|---|---|---|
| 6,436,453 B1 | 8/2002 | van Lengerich et al. |
| 6,468,568 B1 | 10/2002 | Leusner et al. |
| 6,500,463 B1 | 12/2002 | Van Lengerich |
| 6,531,156 B1 | 3/2003 | Clark et al. |
| 6,544,568 B2 | 4/2003 | La Droitte et al. |
| 6,558,718 B1 | 5/2003 | Evenson et al. |
| 6,620,445 B1 | 9/2003 | Knueven |
| 6,723,358 B1 | 4/2004 | Van Lengerich |
| 6,758,715 B2 | 7/2004 | Banks |
| 6,953,593 B2 | 10/2005 | Kuhrts |
| 7,238,380 B2 | 7/2007 | Stillman |
| 2002/0132780 A1 | 9/2002 | Heisey et al. |
| 2005/0211768 A1 | 9/2005 | Stillman |
| 2007/0009576 A1 | 1/2007 | Stillman |
| 2007/0160735 A1 | 7/2007 | Stillman |
| 2008/0014327 A1 | 1/2008 | Stillman |

FOREIGN PATENT DOCUMENTS

| | | |
|---|---|---|
| JP | 6-100442 | 4/1994 |
| JP | 8-275752 | 10/1996 |
| JP | 9-020660 | 1/1997 |
| JP | 09059138 A | 3/1997 |
| JP | 09-245492 | 3/1999 |
| JP | 09-245492 | 9/1999 |
| JP | 11-298103 | 10/1999 |
| JP | 11-512604 A | 11/1999 |
| JP | 2000-232855 | 8/2000 |
| JP | 2001-509007 A | 7/2001 |
| WO | WO 97/11614 A1 | 4/1997 |
| WO | WO 98/19564 A1 | 5/1998 |
| WO | WO 01/62108 | 8/2001 |
| WO | WO 01/70591 A1 | 9/2001 |

OTHER PUBLICATIONS

Markovich, "Physiological Roles and Regulation of Mammalian Sulfate Transporters", Physiological Reviews, 2001 v. 81 No. p. 1499.

Hoffer, et al., "Sulfate Could Mediate The Therapeutic Effect of Glucosamine Sulfate", Metabolism, 2001, v. 50 p. 767.

Hannan, "Effect of Dietary Protein on Bone Loss in Elderly Men and Women", J. of Bone and Mineral Research, 2000 v. 15 p. 2504.

Benefiber Product Label (1999).

ProductScan Online, Worldwide beverage Industry in which products are marketed as containing Fiber or as being a good source of Fiber, 137 Full Reports, Mar. 1, 2003.

ProductScan Online, Asian Beverage Industry in which products are marketed as fruit and Fruit flavored drinks, 154 Full Reports, Dec. 30, 2002.

ProductScan Online, German Beverage Industry in which products are marketed as fruit and Fruit flavored drinks, 127 Full Reports, May 13, 2002.

Takashi Ide, et al., "Hypolipidemic Effects of Guar Gum and It's Enzyme Hydrolysale in Rats Fed Highly Saturated Fat Diets", Ann Nutr. Metab, 1991; 35:34–44 (abstract).

"Reduction in Diarrhea Incidence by Soluble Fiber in Patients Receiving Total or Supplemental Enteral Nutrition," Dept. of Surgery, Ruhr University, Bochum Gammany, Jun. 20, 1994; JPEN, 18:486–90, 1994 (abstract), H. H. Homann et al.

Gary A. Weaver, et al., "Dietary Guar Gum Alters Colonic Microbial Fermentation In Azoxymetana–Treated Rats", J of Nutrition 126(8): 1979–1991 (abstract).

Hidehisa Takahashi, et al., "Effect of Partially Hydrolyzed Guar Gum on Fecal Output in Human Volunteers,"Nutrition Research, vol. 13, pp. 649–657, 1993 (abstract).

Hidehisa Takahashi, et al., "Effect of Liquid Diets with or without partially hydrolyzed Guar. Gum on Intestinal Microbial Flora and Function of Rats", Nutrition Research, vol. 15, No. 4, pp. 527–536, 1995 (abstract).

Hidehisa Takahashi, et al., "Influence of Intact and Partially Hydrolysed Guar Gum on Iron Utilization in Rats Fed On Iron–Deficient Diets", Comp. Biochem. Physical. vol. 109A, No. 1, pp. 75–82 (1994) abstract.

Hidehisa Takahashi, et al., "Influence of Partially Hydrolyzed Guar Gum on Constipation in Women", Vitamental., vol. 40, p. 251–259 (1994).

A. Golay, et al., "The effect of a liquid supplement containing guar gum and fructose on glucose tolerance in non–insulin–dependent diabetic patients", Nutr Metab Cardiovasc Dis (1995) 5:141–148 (abstract).

A. Golay, et al., The effect of a liquid supplement containing gur gum and fructose on glucose tolerance in Non–insulin–dependent diabetic patients, NMCD Nutrition, Metabolism and Cardiovascular Diseases, vol. 5, Jun. 1995.

Hiroshi Hara, et al., Increases in Calcium Absorption With Ingestion of Soluble Dietary Fibre, Guar–Gum Hydrolysate, Depend on the Casecum in Partially Nephrectomized and Normal Rats, British Journal of Nutrition (1996) pp. 773.

Kazuhiro Ohkuma, et al., "Pyrolysis of Starch and Its Digestibility by Enzymes—Characterization of Indigestibility Dextrin—", Matsutani Chemical Research Laboratories Denpun Kagaku, 1990 (37) 107–114.

Brochure by Matsutani Chemical Industry, "Fibersol–2–Physiological Attributes", Feb. 16, 1999.

Brochure by Matsutani America, Inc., Matsutani's Products & Their Functionalities, May 1999.

Brochures by Imperial Sensus LLC, Facts About Insulin/FOS, "Fruitafit Nutritional Information", What is Fruitafit?, 1999.

"Hypochelesterolemic Effect of Sodium Propionate", J. Nutri. Sci. Vitaminol., vol. 41, No. 1, 1995. pp. 77–78, Kishimoto et al.

Novartis Nutrition Corporation, "Benefiber Nutritional Data", Mar. 1999.

Novartis Nutrition Corporation, "Novartis Products", Jan. 31, 2000.

Pamphlet by Imperial Sensus, LLC, "Inulin, A Natural Non–Digestible Carbohydrate Having Healthy Influences For Preventing Disease—Occurrence, History, Preparation, Safety, Physiology and Related Health Implications", Version 23–10.29.99, 1997, 1998, 1999.

Elsworth R. Buskirk, et al., "Body Fluid Balance" CRC Press, 1966, pp. 1–17.

Flavor Encapsulation: A Convergence of Science and Art, Food and Technology, Jul. 2004, vol. 58, No. 7, Porzio et al.

Novel Encapsulation System Provides Controlled Release of Ingredients, Nov. 2003, vol. 57, No. 11, Shefer et al.

Goldschlager Article from http://www.cockeyed.com/inside/goldschlager/goldschlager.html, 2004.

Orbitz Article from http://www.bevnet.com/reviews/orbitz, 2004.

Joanne Slavin, "Commercially Available Enteral Formula With Fiber and Bowel Function Measures", Nutrition in Clinical Practice, vol. 5 pp. 247–250, Dec. 1990.

Y. Ueda, et al., "Effects of Ingestible Dextrin on Blood Glucose and Insulin Levels After Various Sugar Loads in Rats", Japan Nutritional Food Science, 1993, p. 46.

John E. Greenleaf "Problem: Thirst, Drinking Behavior and Involuntary Dehydration" Medicine and Science in Sports and Exercise, pp. 645–656.

Kazuhiro Ohkuma, et al., Pyrolysis of Starch and Its Digestibility by Enzymes–Characterization of Indigestibility Dextrin–Matsutani Chemical Research Laboratories, Denpun Kagaku, 1990 (37) 107–114 (abstract) Figs. 1–7, Tables 1–5.

A.J. Vince, et al., The effect of lactulose, pectin, arabinogalactan and cellulose . . . , British Journal of Nutrition, 1990, vol. 63, pp. 17–26, London.

R. Robinson, et al., Effects of Dietary Arabinogalactan on Gastrointestinal and Blood . . . , Journal of the American College of Nutrition, 2001, vol. 20, 279–285.

http://diabets.webmd.com/is–there–a–diabetes–cure (accessed Jan. 21, 2009).

Y. Ueda, et al., "Effects of Indigestible Dextrin on Blood Glucose and Urine C–peptide Levels Following Sucrose Loading", J. Japan Diab. Soc., 1993 (36), 715–723.

Yuka Kishimoto, et al., "Effects of Intravenous Injection and Intraperitoneal Continual Administration of Sodium Propionate on Serum Cholestrol Levels in Rats", J. Nutri. Sci. Vitaminol., 1995, 73–81.

M. Nummura, et al., "Effect of Dietary Fibers on the Deffusion of Glucose and Metal Ions through Cellulose Membrane", J. Japan Soc. Clin. Nutri., 1992, 141–147.

Yuka Kishimoto, et al., "Hypocholesterol Effect of Dietary Fiber: Relation to Intestinal Fermentation and Bile Acid Excretion", J. Nutr. Sci. Vitaminol., 1995, 151–161.

K. Tokunaga, "Effects of a Food for Specified Health Use (FOSHU) Which Contains Indigestible Dextrin as an Effective Ingredient on Glucose and Lipid Metabolism", J. Japan Diab. Soc., 1999, 61–65.

S. Wakabayashi, et al., "Effect of Indigestible Dextrin on Sugar Tolerance: II. Effect of Continuous Administration in Rats Fed on a High Sucrose Diet", J. Japan Diab. Soc., 1992, 873–880.

S. Wakabayashi, "The Effects of Indigestible Dextrin on Sugar Tolerance: III. Improvement in Sugar Tolerance by Indigestible Dextrin on the Impaired Glucose Tolerance Model", Folia Endocrinol., 1993, 594–608.

S. Wakabayashi, "The Effects of Indigestible Dextrin on Sugar Tolerance: I. Studies on Digestion–Absorption and Sugar Tolerance", Folia Endocrinol., 1992, 623–635.

S. Wakabayashi, "Effects of Indigestible Dextrin on Glucose Tolerance in Rats" Journal of Endocrinology, 1995, 533–538.

S. Wakabayashi, et al., "Acute Toxicity and Mutagenicity Studies of Indigestible Dextrin, and Its Effect on Bowel Movement of the Rat", J. Food Hyg. Soc. Japan, 1992, 557–562.

M. Satouchi, et al., "Effects of Indigestible Dextrin on Bowel Movements", Jpn. J. Nutrition, 1993, 31–37.

BetaCote™ Technical Information, Lycored Natural Products Industries, accessed via the internet on Sep. 18, 2009 att URL <http://www.lycored.com/web/content/betacote–tech.asp.

A. Golay, et al., "The effect of a liquid supplement containing guar gum and fructose on glucose tolerance in non–insulin–dependent diabetic patients", Nutr Metab Cardiovasc Dis (1995) 5: 141–148.

International Search Report dated Jun. 4, 2001 for International application No. PCT/US01/05630.

"Hypochelesterolemic Effect of Sodium Proprionate", J. Nutri. Sci. Vitaminol., vol. 41, No. 1, 1995, pp. 77–78.

Labell, F., "Functional Nutritional Fiber," Prepared Foods, 164(11):87 (1995).

Deis, R., "Dietary Fiber: A Healthy Discussion," Food Product Design. Jan. 1999.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 4 are determined to be patentable as amended.

Claims 2, 3 and 5-13, dependent on an amended claim, are determined to be patentable.

New claims 14-16 are added and determined to be patentable.

1. A water composition consisting essentially of safe water and one or more water-soluble indigestible fibers, selected from a group consisting of inulin, dextrin, maltodextrin and partial hydrolyzates of the fibers from said group, forming a solution whose physical properties are similar to potable water, where total fiber constitutes [at least] *between* 0.1 to 10% by weight of said solution; *and wherein fewer than 10 calories per 100 ml are metabolized by a human when consuming the water composition.*

4. The water composition of claim 1, wherein the amount of said [watersoluble] *water soluble* fiber is selected [to satisfy] *so that the water composition satisfies* simultaneously both hydration requirements and fiber requirements when consumed.

*14. The water composition of claim 1 wherein said water-soluble indigestible fiber is inulin or a partial hydrolyzate thereof.*

*15. The water composition of claim 1 wherein said water-soluble indigestible fiber is dextrin or a partial hydrolyzate thereof.*

*16. The water composition of claim 1 wherein said water-soluble indigestible fiber is maltodextrin or a partial hydrolyzate thereof.*

* * * * *